Feb. 7, 1956 — S. E. PROCTOR — 2,733,905
TOOL-CARRYING CHAINS HAVING BALL AND
SOCKET CONNECTIONS BETWEEN LINKS
Filed June 9, 1952 — 2 Sheets-Sheet 1
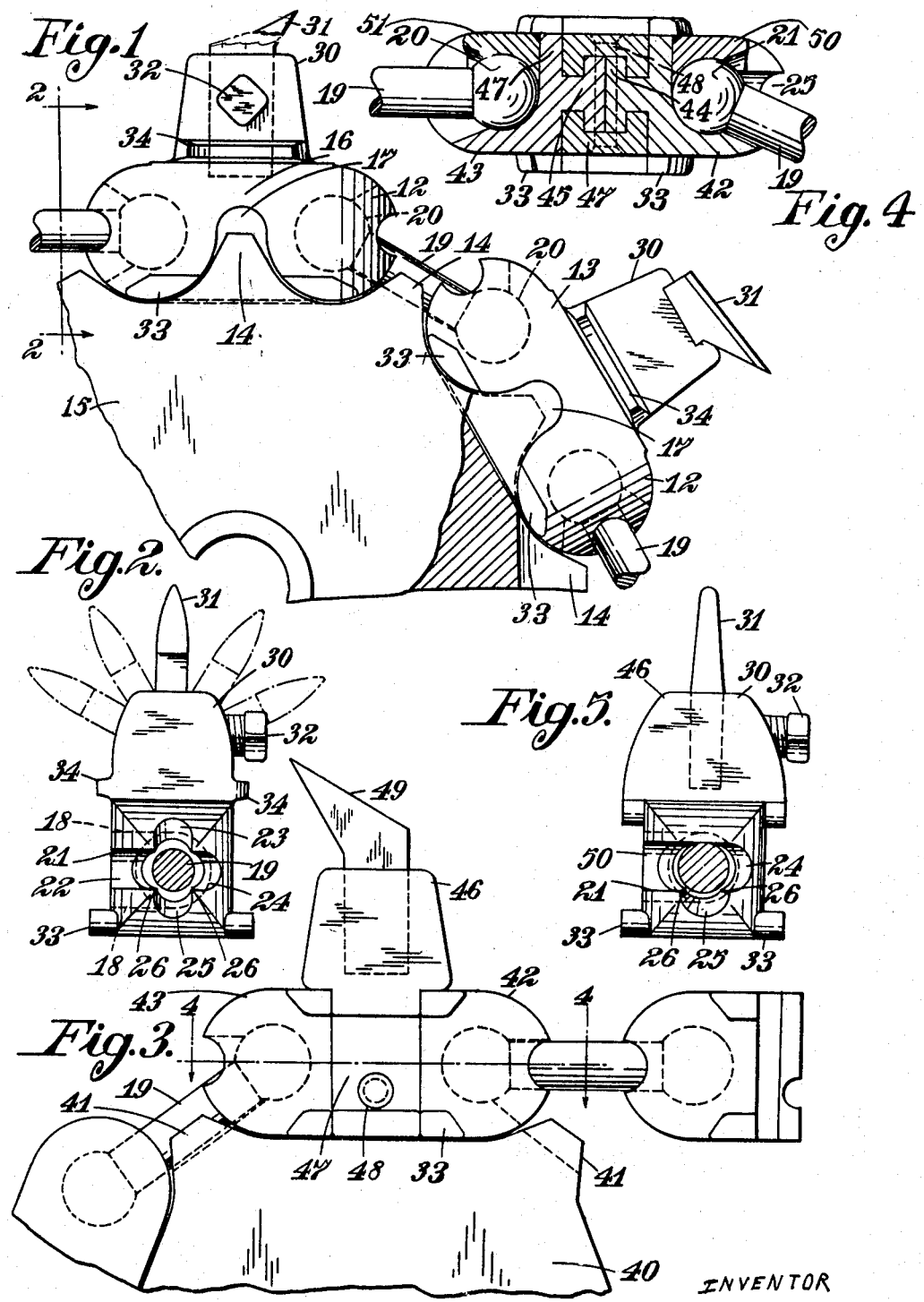
INVENTOR
Sidney E. Proctor
By Watson, Cole, Grindle & Watson
ATTORNEYS.

INVENTOR
Sidney E. Proctor
By Watson, Cole, Grindle & Watson
ATTORNEYS

United States Patent Office 2,733,905
Patented Feb. 7, 1956

2,733,905

TOOL-CARRYING CHAINS HAVING BALL AND SOCKET CONNECTIONS BETWEEN LINKS

Sidney Ernest Proctor, Aylesbury, England, assignor to Austin Hoy and Company Limited, Aylesbury, England, a British company Application June 9, 1952, Serial No. 292,549

15 Claims. (Cl. 262—33)

This invention comprises improvements in or relating to coal cutter chains.

The invention relates to coal cutter chains in which the connection between the links is effected by ball and socket joints. One such construction is described in the specification of our United States patent application Serial No. 272,229.

In the construction described in the aforesaid patent application there is a ball on a neck which projects from one link and enters a socket in the adjacent link. The neck of the ball is arranged so that its axis is radial to a chain sprocket over which the chain runs and while this allows the chain to bend both round the sprocket and also laterally it constrains twisting movement of the chain about an axis extending longitudinally through the centres of several joints. Such restraint is desirable in some connections, but not in all, and the present invention provides a construction which is capable not only of bending in two directions but of twisting about a longitudinal axis when required.

One of the difficulties which exists in making a satisfactory ball and socket chain is that of assembling the parts so that they cannot come adrift and at the same time providing adequate bearing surface to withstand endwise pull under the rough conditions which exist in coal cutting. It is not permissible to use soft metal for the socket and close it over the ball around the ball stem after assembly as is done in many light types of chain such as are used for sanitary fittings.

The present invention contemplates the employment of a coal cutter chain in which a series of socketed links are each provided with apertures to the sockets opening endwise out of the links so as to pass ball stems, but not large enough to pass a ball which fits the socket, balls in the sockets with stems thereon projecting through the apertures, alternative apertures in the links large enough to pass a ball and opening into each of the sockets from different faces of the links from those through which the stems pass, so that the balls can be entered into the sockets therethrough, and plugs closing said alternative apertures to retain the balls in the sockets.

The stems of the balls in some cases may be integral with the balls themselves, and in other cases, to facilitate assembly, the balls are screwed to receive the stems. In certain instances the alternative apertures in the links which are plugged up may be in the sides of the link and the plugs may act as liners for part of the socket walls. In other cases the plugs may be in the base of the socket, and various constructions in accordance with the invention are hereinafter described.

The following is a description by way of example of certain embodiments of the invention, reference being made to the accompanying drawings in which:

Figure 1 is a side elevation of one form of chain and of a sprocket on which it runs, Figure 2 is a cross section through one of the chain links upon line 2—2 of Figure 1 looking in the direction of the arrows, Figure 3 is a side elevation of another form of chain.

Figure 4 is the longitudinal section through one of the links of the chain shown in Figure 3 looking in the direction of the arrows 4, Figure 5 is an end view of the link shown in Figures 3 and 4.

Figure 6:
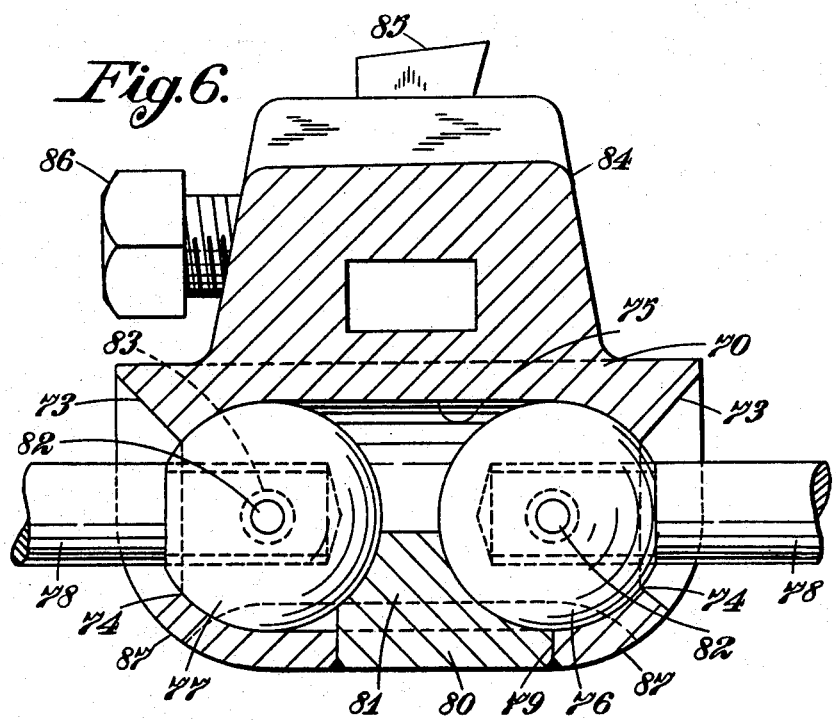
Figure 6 is a vertical longitudinal section through an alternative construction of link.

Referring to Figures 1 and 2 each alternate link of the chain has two end portions 12, 13 respectively in the form of enlarged cylindrical ears to fit in the hollows between the teeth 14 of the chain sprocket 15. The ears 12, 13 are bridged on the outer side of the chain by a connecting portion 16. Moreover, a web 17 extends between them in the centre, the web lying when the chain is on the sprocket in a space which is machined out between the two side portions of the teeth 14, as best seen in the broken away portion at the right hand side of Figure 1. The central web 17 and the ears 12, 13 are forged in one piece and the web 17 gives to the link great longitudinal strength. The ears 12, 13 at each end of the chain are hollowed out by a lateral drilled hole indicated by the dotted lines 18 in Figure 2, the bottom end of the hole being rounded to constitute one side of a socket. Connecting links between the main links of the chain are formed by shanks 19 which carry at their ends ball members 20 to fit in the sockets formed in the ears 12, 13 by the drilled holes 18. In order to permit the shanks 19 to be entered into the sockets, slots 21 (Figure 2) are cut through the ends of the ears 12, 13, the slot 21 extending parallel to the holes 18 and opening to them. After the ball members have been inserted into the sockets the holes 18 are stopped by plugs 22 which fit the holes 18 and are hollowed out at their ends to fit upon the ball members 20. The plugs 22 are retained in place in the holes 18 either by peening over the metal of the ears 12, 13 all around the plugs or by lightly welding the plugs in place. It will be noted that the teeth 14 of the sprocket are divided by the slots which are cut through them to accommodate the webs 17 into two part teeth, and this division also permits the shanks 19 to fall into place between the two halves of the teeth 14.

The ends of the ears 12, 13 are opened out around the shanks 19 to permit the chain to bend. As seen in Figure 2 of the drawing the sockets are machined with slots 23, 24 and 25 which, in conjunction with the slot 22, permit the shank 19 to be inclined either to the left, to the right, upward or downwardly to the full extent which the bending of the chain may require. In between the slots the metal forms cusps 26 which approach the shank 19 fairly closely. These cusps afford increased bearing surface of the ears 12, 13 over the balls which they embrace so that the resistance to tension of the chain and to wear in use upon the balls and sockets is increased. This improves the life of the chain and is a matter of considerable importance. In many cases it is possible to omit the outwardly extending slot 23, as is shown in Figure 5 of the drawing, with the result that still greater strength and resistance to wear is obtained. Pick-carrying bosses 30 are formed on the links and are drifted out to receive picks 31 which are held in place by setscrews 32. The ears 12, 13 carry at their bases lateral projections 33 which form flanges for engaging in the guides of a chain jib. At the outer or upper portion of the centre of each link on each side of the base of the pick boxes 30 there are other flanges 34 which run on the outer edge surfaces of the chain jib. The jib is not shown in the drawing as it is of normal construction. It will be appreciated that the pick boxes 30 are drifted out at various angles in accordance with the particular angle at which the picks 31 are intended to run, the successive links in the chain having picks of different angles, as indicated in chain lines in Figure 2 in accordance with the usual practice.

Referring now to Figures 3, 4 and 5, these show a somewhat different form of pick-carrying link intended to run on a sprocket 40 which has teeth 41 only between the pick-carrying links, the links not being hollowed out to receive a pick in their centre portion as is shown in Figures 1 and 2. The shanks 19 with their ball ends are similar to the shanks of the connecting links 19 of Figures 1 and 2, and the teeth 41 are machined out in their centre so as to constitute double teeth in order to receive these shanks as in the case of the sprocket 15, although not so deeply because the bases between the sides of the teeth 41 only need to accommodate the shanks 19 and do not have to be deep enough to accommodate webs such as the web 17 of Figure 1.

The main or pick-carrying links are constituted by two end socket portions 42, 43 of case-hardened steel which are formed with T-shaped projections 44, 45 as shown in Figure 4, the heads of which butt on one another and of an oil-hardened tough pick-carrying boss 46 which has a root portion 47 machined out to fit around the T-shaped portions 44, 45 of the end parts 42, 43 of the link. When the shank 47 of the pick-carrying boss 46 is fitted in place it unites the whole link together and the parts are prevented from moving relatively to each other by a rivet 48 which passes through the shank 47 from side to side. The pick boxes 46 carry tools 49 similar to the tools 31 of the pick boxes 30 shown in Figures 1 and 2.

As before the sockets are formed by drilling out from one side of the boxes 42, 43 which contain them and by fitting in a welded plug 50, 51 (Figure 4) after the ball members 20 have been assembled in place. As before liberty of movement is accorded to the shanks 19 by machining out the metal around the shanks in the form of slots 24, 25, the metal forming cusps 26 between the slots.

Figure 7:
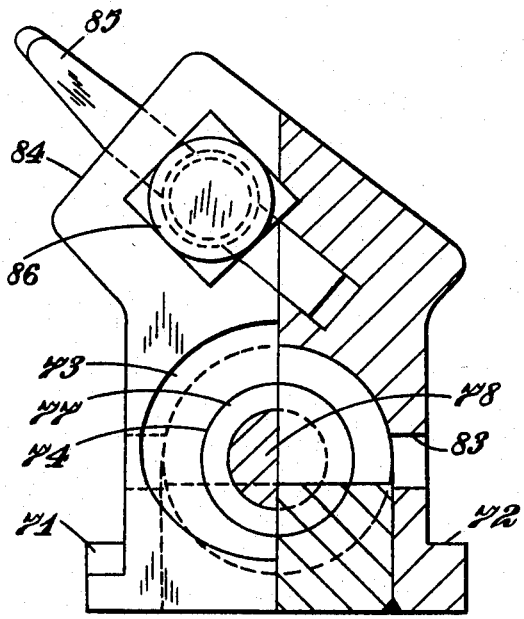
Figure 7 is an end view of the link shown in Figure 6 with the ball members omitted.

Referring now to Figures 6 and 7, these show a chain comprising link members 70 which are rectangular in transverse section but have flanges 71, 72 along their two bottom edges to fit in the chain guides of a coal cutter jib in the usual way. Each of the links 71 is bored right through from end to end, the bore being flared at its ends as indicated at 73. At the inner end of the flared portion the bore, as shown at 74, is smaller than the main body 75 of the bore within the link. The ends of the bore 75 are made spherical to fit balls 76, 77 which have stems 78 screwed into them, the stems projecting through the flared portions 73 at the ends of the link.

In the base of each link there is an aperture 79 which extends upwardly into the bore 75 and which is of the same diameter as the ball members 76, 77 so that the ball members may be inserted through it upwardly into the link when their stem portions 78 have been unscrewed from them. The aperture 79 is made somewhat nearer one end of the link than the other so that if the ball member 77 is inserted upwardly into the bore 75 and then moved along the bore towards the end of the link, to the left as viewed in the figure, and space is left for the insertion of the other ball member 76 to be passed up into the bore 75 after the ball 77. In order to keep the construction as compact as possible, it is necessary for the screwed ends of the ball members, which as viewed in side elevation look flat, as seen in the figure, to face one another when the balls are inserted. After insertion the balls can be rotated in their sockets until the screwed portions face the apertures 74 in the ends of the link and the stems can then be screwed into the balls.

After the balls have been brought into the position shown in the drawing, the aperture 79 is stopped up with a plug 80 which is welded in situ. The plug 80 carries an upstanding retaining portion 81 which is machined with two spherical seats to bear on the backs of the two balls 76, 77 and to hold them up to the socket-shaped ends of the bore 75 in the link. The screw-threaded apertures in the balls 76, 77 which receive the stems 78 are traversed by diametrical holes 82 which pass right through the stems 78 and the balls 76 or 77 as the case may be, and are intended to receive rivets. The link 70 has holes 83 drilled through it somewhat larger than the rivet holes 82 and after the balls have been inserted into the link they are manoeuvred until the holes 82 in the balls come opposite the holes 83 in the sides of the link. A tommy-bar inserted into one of the holes 82 through one of the holes 83 will serve to hold the ball from rotation while the screwed stem 78 is screwed up tight. The stem 78 has a hole through it which comes into line with the hole 82 and when the stem has been screwed until its hole is in line with the hole in the ball in which it is screwed, the tommy-bar can be removed and a rivet inserted through the hole 83 into the ball 76 or 77 as the case may be, and can be riveted up flush with the surface of the ball by means of a closing tool applied through the holes 83 in the sides of the link. If the ends of the rivets are flush with the surfaces of the balls they will not interfere with the movement of the balls when the chain is in use.

By joining a series of links such as the links 70 together by means of ball members and stems such as 78 the chain can be built up.

Each of the links 70 carries a boss 84 to receive a coal cutter pick 85 held in place by the usual set screw 86. As will be readily understood, each of the bosses 84 on the successive links of a chain carries a tool which is set at a different angle to the centre line of the chain to the angle of the boss in the link immediately succeeding or preceding it so that the successive picks 85 project at various angles and cut an appropriate kerf in the coal.

It will be observed that the above chain comprises socketed links which are entirely made of solid metal, the sockets surrounding the balls on all sides without any slots and without any deforming of the metal after assembly and that the dumb-bell members comprising two balls and a stem each set in direct tension to transmit the pull on the chain from link to link. This provides an efficient and strong method of connecting the links together.

The undersides of the ends of the socketed links are rounded off so that they fit between successive teeth of the sprockets round which the chains run in coal cutting machines.

If desired in the constructions shown in Figures 6 and 7, the sockets which are formed in the ends of the links 70 may be lined with hemispherical liners. Each such liner would be formed by means of a hemispherical cup held in position by spot welding and could be renewed in the event of wear.

I claim:

1. A coal cutter chain comprising in combination a series of cutter pick carrying socketed links having apertures to the sockets opening out of the links so as to pass ball-stems but not large enough to pass balls fitting the sockets, balls in the sockets with stems projecting through the apertures, additional apertures in the socketed links large enough to pass a ball and opening into each of the sockets from different faces of the links from those through which the stems pass so that the balls can be entered into the sockets therethrough, and plugs closing said additional apertures said plugs being shaped to engage the balls and retain them free from backlash in the sockets.

2. A coal cutter chain comprising in combination a series of cutter pick carrying socketed links having apertures to the sockets opening endwise out of the links so as to pass ball-stems but not large enough to pass balls fitting the sockets, balls in the sockets with stems profrom different faces of the links from those through which jecting through the apertures, additional apertures large enough to pass a ball and opening into each of the sockets the stems pass so that the balls can be entered into the sockets therethrough, and plugs closing said additional apertures said plugs being shaped to engage the balls and retain them free from backlash in the sockets.

3. A coal cutter chain as claimed in claim 2 wherein the stems of the balls themselves carry balls on the other end engaged in similar sockets of adjacent links.

4. A coal cutter chain as claimed in claim 2 wherein the said additional apertures in the links which are plugged up are in the sides of the links.

5. A coal cutter chain comprising alternate links having sockets at each end, connecting links between them in the form of shanks each having a ball at each end, the socketed links being provided with lateral plugs to each socket which plugs fit upon the balls in the sockets and prevent backlash and slots beside the plugs to pass the shanks of the connecting links.

6. A coal cutter chain as claimed in claim 5 wherein each of the socketed links has two end portions in the form of enlarged cylindrical ears to fit in the hollows between the teeth of a chain sprocket and the sockets are formed in the ears.

7. A coal cutter chain as claimed in claim 5, the slots extending in the directions in which it is desired that the chain shall be able to bend and the metal of the sockets between the slots extending close to the shanks for the purpose described.

8. A coal cutter chain comprising in combination a series of socketed links having sockets at each end opening endwise out of the links so as to pass ball stems but not large enough to pass balls fitting the sockets, balls in the sockets with stems projecting through the apertures at each end of said link, apertures in the bases of the links large enough to pass the balls to enable them to be entered in the links, means permitting the ball stems to be connected with balls of adjacent links, and plugs in the apertures in the bases of the links having surfaces upon them to bear on the backs of the balls in the sockets.

9. A coal cutter chain as claimed in claim 8 wherein the balls are screw-threaded to receive the stems to permit assembly of the chain.

10. A coal cutter chain as claimed in claim 9 wherein the links are provided with apertures in their sides and balls are provided with rivet holes passing through the screw-threaded portion of the balls, the apertures in the sides of the links being so located as to permit of insertion or removal of rivets or the equivalent in the rivet holes.

11. A coal cutter chain as claimed in claim 8 wherein the plugs in the bases of the links are displaced from the centre line of the links in the direction towards one of the ends for the purpose of facilitating assembly.

12. A coal cutter chain as claimed in claim 5, wherein the socketed links are built from three separate units, two end units containing the sockets and a central unit uniting the end units together and being provided with a tool carrying boss, said units having projections and recesses provided on and in the units respectively so that on assembly the three units form a complete link.

13. A coal cutter chain as claimed in claim 12, wherein the said projections are on the end units and the recesses are in the central unit, which projections and recesses form a dovetail joint between the units.

14. A coal cutter chain as claimed in claim 12, wherein the said projections are T-shaped and are on the end unit, and the recesses are shaped to fit the projections and are in the central unit.

15. A coal cutter chain as claimed in claim 5, when used in combination with a sprocket, which sprocket has a series of teeth, hollowed out at their tips, spaced around its periphery, and flat land portions between the teeth against which the pick carrying links can rest while they are in contact with the sprocket.

References Cited in the file of this patent

UNITED STATES PATENTS

| 267,665 | Brayton | Nov. 21, 1882 |
| 443,769 | Hurford | Dec. 30, 1890 |
| 566,095 | Reenstierna | Aug. 18, 1896 |
| 889,195 | Bowman | June 2, 1908 |
| 2,211,525 | Stenger et al. | Aug. 13, 1940 |
| 2,566,675 | Proctor | Sept. 4, 1951 |

FOREIGN PATENTS

| 150,421 | Great Britain | Aug. 31, 1920 |